July 26, 1960 H. DA COSTA 2,946,595

GRAMOPHONE RECORD CHANGING MECHANISMS

Filed April 12, 1957

INVENTOR

HARRY DA COSTA

BY

William [illegible]

ATTORNEY

United States Patent Office 2,946,595 Patented July 26, 1960

2,946,595

GRAMOPHONE RECORD CHANGING MECHANISMS

Harry da Costa, Chicago, Ill., assignor to The Plessey Company Limited, Ilford, England, a British company Filed Apr. 12, 1957, Ser. No. 652,632

6 Claims. (Cl. 274—10)

Figures 1, 2, 3, 4, 5:
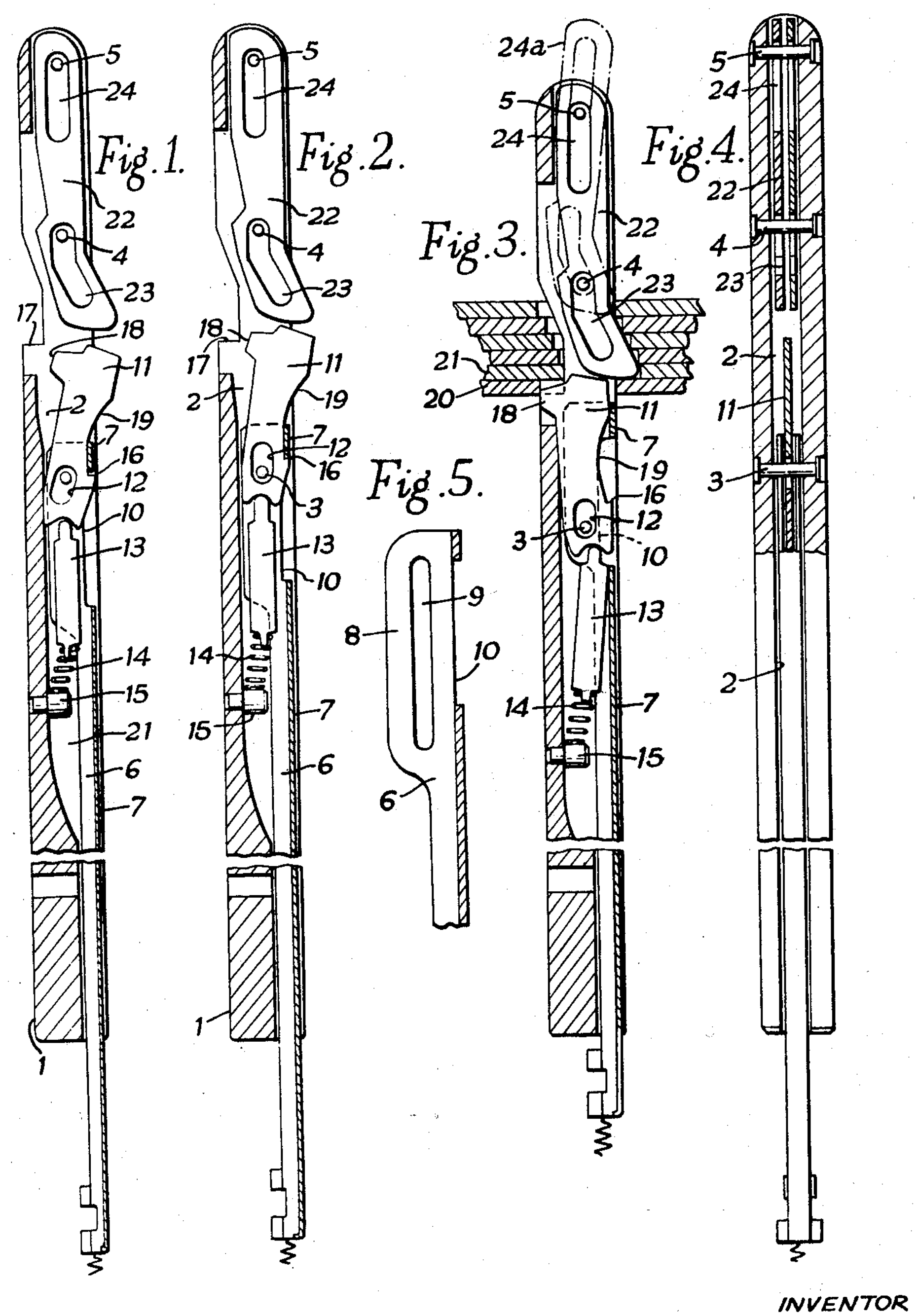

This invention relates to gramophones and is an improvement on, or modification of, the record-changing mechanism described and claimed in the complete specification of our British Patent No. 663,679.

According to the latter a portion at one side of a central record supporting spindle is cut away to form a shelf, on to which the lowermost record of a stack of records is guided by a retractable record guide, which will remain extended under the downwardly acting weight of the stack of records, but will retract into the spindle when an upwardly directed force is exerted on it by a record which is being lifted off the turntable. The record guide terminates above the level of the shelf by at least the thickness of a record, so as to allow the lowermost record to be released by being pushed off the shelf.

The pushing off is effected by means of a cam lever which is pivotally supported in the spindle. As the released record drops down the spindle, the next following record comes to rest on the cam lever, the shock being preferably absorbed by a buffer spring. The cam lever is then lowered axially of the spindle until its projecting part is below the level of the shelf, thereby transferring the load of the stack of records from the cam lever to the shelf, and allowing the lever to move back to its initial position before the next record is released.

In the embodiment described in the said specification No. 663,679, the supporting spindle has a coaxial bore, and the cam lever, which has a lug projecting into an axially elongated aperture in the spindle wall, is actuated by a rod slidable in the spindle bore. The end of the rod is bifurcated by a slot to straddle the cam lever, and a pin extending across the slot co-operates with a cam slot in the cam lever so that raising of the rod first allows the cam lever to rise above the level of the shelf and then tilts it about the lug so as to push a record off the shelf, whereafter the rod is lowered again, and a buffer spring interposed between the lever and rod is utilised by a cam action to tilt the lever back to its initial position. The record guide is in this construction normally held down in its extended position by a spring which is supported against a cap fixed to the upper end of the spindle, a pin-and-cam slot guide being provided to ensure retraction of the record guide on upward movement against the spring action and vice versa.

The present invention has for an object to provide an improved construction, which can be more readily manufactured. It relates to centre spindle mechanism of the kind, hereinafter called the kind specified, in which the centre spindle is provided with a shoulder on which the lowest record of a stack of records can rest, supporting the remainder of the stack, and which comprises record-release mechanism actuable from a point near the lower end of the spindle by an actuating rod member the greater part of which is accommodated inside the spindle for pushing the record at the bottom of the stack from the said shelf to drop along the spindle on to the gramophone turntable, and record guide means for automatically guiding each record as it reaches the bottom of the stack, on to the said shelf, while permitting records to be manually lifted off the spindle past the said shelf.

According to the invention the centre spindle is provided with a longitudinal slot, in which the actuating rod of the record release mechanism is accommodated. Preferably the slot is formed as a groove formed along one side of the spindle. The record release mechanism and the record guide means are preferably likewise mounted to be retractable into the groove, the depth of which may be locally increased for the purpose.

According to one aspect of the invention the necessity of providirng the longitudinal bore of the spindle is avoided by forming the spindle with a longitudinal slot or groove, in which an elongated actuating member is guided preferably by at least one cross pin fixed in one, and slidably engaging a longitudinal slot, or longitudinal slots, of the other, of the spindle and actuating members. For example the actuating member may be a strip of metal plate bent to U-shape along a longitudinal line, and a pin fixed in the slotted spindle may extend through longitudinal slots in the two U flanges.

The record guide serving to deflect the records to the shelf is preferably likewise guided in the slot of the spindle; two pins extending across the slot may respectively co-operate with a straight, longitudinal slot near the upper end of the record guide and with a cam slot near the lower end of this guide. No spring for the record guide and no end cap is required with this construction.

In carrying out the invention a cam lever may be pivoted by a longitudinal slot co-operating with the pin which serves to guide the actuating member, a thrust spring interposed between the lever and a stop fixed in the slot of the spindle urging the lever upwardly and outwardly. The shelf is preferably arranged oppositely to the slot of the spindle, and the back of the U-profile actuating member is arranged at the outer side of the slot, the end of the back co-operates with a cam surface at the back of the cam lever for moving the latter to push a record off the shelf.

In the accompanying drawing,

Figures 1, 2 and 3 are longitudinal sections of a spindle incorporating the invention, showing the device in three different positions, Figure 4 is a longitudinal section taken at right angles to Figures 1 to 3, and Figure 5 is a sectional side elevation of the upper end of the actuating element.

The supporting spindle 1 has a longitudinal slot 2 which extends through part of the spindle diameter, and across which extend three riveted pins 3, 4 and 5.

A U-profile actuating member is shown at 6. Its back 7 lies at the outer side of the slot 2. Near its upper end its flanges have widened portions 8, each formed with a longitudinal slot 9, through which the pin 3 extends. Part of the back 7 of member 6 is removed to form an aperture 10. A cam lever 11 is inserted between the two flanges of the U-section actuating member and has a slightly elongated aperture 12 through which the pin 3 projects. A thrust link 13 is urged against the lower side of lever 11 by a spring 14, which is supported against a stop 15 accommodated in a deepened portion 21 of the slot 2, tending to apply the lower end of the slot 12 to pin 3, as shown in Figure 2. However, when the actuating member 6 is in its lowest position as shown in Figure 1, the upper edge of the aperture 10 in the back 7 of actuating member 6 acts on a lug 16 formed at the back of the cam lever 11 to lower the cam lever 11 against the action of the spring 14 so that its nose 18 is below the level of the shelf 17 formed on the opposite side of the spindle 1. To change a record, the actuating member 6 is raised from the position of Figure 1 through that of Figure 2 to that of Figure 3. During the latter part of this movement the upper edge of the back 7 of the actuating member 6 acts on a cam surface 19 at the back of the cam lever 11 to tilt this lever about the pin 3 and push the lowest record 20 off the shelf 17 as shown in Figure 3. The next following record 21 will drop on to a nose 18 of the cam lever 11, so as to be intercepted by the cam lever 11, which is buffered by the spring 14. The actuating member 6 is then moved downward to the position of Figure 1. This movement lowers nose 18 of cam lever, whereby the stack of records is again deposited on the shoulder 17, and, when the nose of cam lever 11 is clear of the stack, the action of the upper edge of aperture 10 on lug 16 of the cam lever 11 tilts the latter back to the position shown in Figure 1, in which it is then retained due to the lug 16 being held against the end of slot 10 by the spring 14.

The upper part of the slot 2 accommodates a record guide member 22 which has a curved guide slot 23 and a straight guide slot 24. These slots co-operate with the pins 4 and 5 so that when a record is lifted off the spindle, the record guide 22 is moved to the withdrawn position indicated in broken lines at **24*a* in Figure 3, and then returns by gravity to its normal position shown in full lines, in which it guides the lowermost record of the stack on to the shelf 17 of the spindle 1**.

It should be appreciated that when the mechanism as illustrated is mounted in a gramophone base to extend through the spindle bore of the latter, the walls of this bore, provided if desired or necessary with a metal liner, prevent the lower end of the actuating member 6 from moving out of the groove 2, thus co-operating with pin 3 in the spindle 1 and slots 9 in the actuating member 6 to form a linear guide for this.

The apparatus described may be varied as regards details within the scope of the invention, for example by reversing the arrangement of the two elements of a pin-and-slot guide. For example the pin 5 could be replaced by a pin fixed in member 22, co-operating with longitudinal slots, similar to slot 24, in the spindle 1.

What is claimed is:

1. A centre spindle assembly for a record-changing phonograph, comprising a rod-like straight spindle which is notched to provide a shoulder facing towards one end of the spindle and which is provided with a parallel-walled longitudinal groove extending from the other end of the spindle at least to a point substantially diametrically opposite to the shoulder, a record-release member movably mounted in said groove adjacent to the shoulder for co-operation with a record resting on said shoulder, an actuating rod mounted in said groove for movement longitudinally of the spindle to operate said record-release member, and a cross-pin-and-slot guide interconnecting said actuating rod and spindle in a zone between the shoulder and said other end of the spindle to prevent movement of the rod towards and away from the bottom of the groove while permitting movement longitudinally of the spindle, the actuating rod consisting of a flat strip of metal folded to a U-like profile facing the bottom of the groove, the back of the profile being substantially flush with the cross-sectional profile of the spindle, and the depth of the groove being, in a zone adjacent to said other end of the spindle, substantially equal to the height of the U-profile and less than half the diameter of the spindle.

2. A centre spindle assembly as claimed in claim 1, wherein the cross-pin-and-slot guide includes a pin secured in the spindle to extend across the groove, longitudinal guide slots co-operating with said pin being provided in the parallel side walls of the U-profiled actuating rod.

3. A centre-spindle assembly as claimed in claim 1, wherein the record release member comprises a lever of flat profile, and the cross-pin-and-slot guide includes a pin secured in the spindle to extend across the groove, longitudinal guide slots co-operating with said pin being provided in the parallel side walls of the U-profile actuating rod, the second release lever extending between the shanks of the profile of the actuating rod and having an aperture through which said cross-pin passes for pivotally connecting said release lever to the spindle.

4. A centre spindle assembly as claimed in claim 3, wherein said aperture in the release lever is elongated to permit limited longitudinal movement of the release lever relative to the cross-pin, the assembly further comprising a longitudinally sprung buffer element also accommodated in the groove of the spindle and interposed between a support point in the groove between the release lever and said other end of the spindle and a point of the release lever substantially facing said support point.

5. A centre spindle assembly as claimed in claim 3, wherein the record-release lever is formed with a cam surface co-operating with the back of the U-profile actuating rod, whereby movement of the actuating rod towards said one end of the spindle produces outward movement of the lever relative to the shoulder provided on the spindle.

6. A centre spindle assembly as claimed in claim 4, wherein the record-release lever is formed with a projection arranged to the rear of the cam surface, and the web portion of the U-profile actuating rod is formed with an aperture into which said projection extends, and which extends longitudinally of the actuating rod for a length sufficient to clear the projection of the record-release lever throughout the movement of the actuating rod for operating the release lever to release a record from the shoulder, the portion of the web between the said aperture and the point engaging the cam surface of the record-release lever co-operating with said projection for returning the release lever when the actuating rod is moved in the direction towards said other end of the spindle.

References Cited in the file of this patent

UNITED STATES PATENTS

| | | |
|---|---|---|
| 2,634,983 | Dale | Apr. 14, 1953 |
| 2,640,703 | Smith | June 2, 1953 |
| 2,641,474 | Zandelin | June 9, 1953 |
| 2,726,088 | Da Costa | Dec. 6, 1955 |